(12) United States Patent  
Braunstein et al.

(10) Patent No.: US 8,516,395 B2
(45) Date of Patent: Aug. 20, 2013

(54) ONE-DIMENSIONAL REPRESENTATION OF A TWO-DIMENSIONAL DATA STRUCTURE

(75) Inventors: Ariel Braunstein, San Francisco, CA (US); Jonathan Kaplan, San Francisco, CA (US); John Furlan, Belmont, CA (US); Richard Tobais Inman, San Francisco, CA (US); Elizabeth A. Cleary, San Francisco, CA (US); Michael Jones, San Francisco, CA (US); Ryan Devenish, San Francisco, CA (US); Matthew John Barthelemy, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 601 days.

(21) Appl. No.: 12/750,576

(22) Filed: Mar. 30, 2010

(65) Prior Publication Data

US 2011/0246928 A1  Oct. 6, 2011

(51) Int. Cl.
*G06F 3/00* (2006.01)

(52) U.S. Cl.
USPC ........... 715/835; 715/775; 715/829; 715/853; 715/854

(58) Field of Classification Search
USPC .......................... 715/775, 835, 853–854, 829
See application file for complete search history.

(56) References Cited

U.S. PATENT DOCUMENTS

| | | | | |
|---|---|---|---|---|
| 5,677,708 A * | 10/1997 | Matthews et al. | ....... | 348/E5.104 |
| 6,978,127 B1 * | 12/2005 | Bulthuis et al. | ............ | 455/412.1 |
| 7,461,061 B2 * | 12/2008 | Aravamudan et al. | ................ | 1/1 |
| 7,581,186 B2 * | 8/2009 | Dowdy et al. | .................. | 715/727 |
| 7,743,343 B2 * | 6/2010 | Fong et al. | ...................... | 715/841 |
| 7,797,641 B2 * | 9/2010 | Karukka et al. | ............... | 715/802 |
| 7,840,907 B2 * | 11/2010 | Kikuchi et al. | ............... | 715/790 |
| 7,996,788 B2 * | 8/2011 | Carmichael | ................... | 715/834 |
| 8,185,824 B1 * | 5/2012 | Mitchell et al. | ............... | 715/734 |
| 8,214,739 B2 * | 7/2012 | Yoritate et al. | ................ | 715/716 |
| 2004/0255253 A1 * | 12/2004 | Marcjan | ....................... | 715/789 |
| 2005/0091596 A1 * | 4/2005 | Anthony et al. | ............... | 715/712 |
| 2005/0235224 A1 * | 10/2005 | Arend et al. | ................... | 715/792 |
| 2006/0069997 A1 * | 3/2006 | Hsieh et al. | .................... | 715/713 |
| 2006/0288304 A1 * | 12/2006 | Nomoto et al. | ................ | 715/781 |
| 2007/0061745 A1 * | 3/2007 | Anthony et al. | ............... | 715/764 |
| 2008/0062141 A1 * | 3/2008 | Chandhri | ....................... | 345/173 |
| 2008/0301590 A1 * | 12/2008 | Ostergaard et al. | ........... | 715/853 |
| 2010/0082670 A1 * | 4/2010 | Chan et al. | ..................... | 707/770 |
| 2010/0125786 A1 * | 5/2010 | Ozawa et al. | ................. | 715/702 |
| 2010/0146435 A1 * | 6/2010 | Cros | ............................. | 715/786 |

(Continued)

OTHER PUBLICATIONS

Dropshots.com, 2009.

*Primary Examiner* — Ryan Pitaro
(74) *Attorney, Agent, or Firm* — Patterson & Sheridan, LLP

(57) ABSTRACT

A method that includes causing at least a portion of a first representation of a first file and at least a portion of a second representation of a second file to be displayed in a user interface on a display associated with a computing device, where the first file is included in a first folder included in a folder structure stored in a memory included within the computing device, and the second file is included in a second folder included in the folder structure. The method further includes receiving user input to navigate content stored in the folder structure, and, in response to the user input, causing the at least a portion of the first representation and the at least a portion of the second representation to move in a first direction within the user interface.

22 Claims, 6 Drawing Sheets

(56) References Cited

U.S. PATENT DOCUMENTS

| | | | |
|---|---|---|---|
| 2010/0269070 A1* | 10/2010 | Kim | 715/838 |
| 2011/0010307 A1* | 1/2011 | Bates et al. | 705/347 |
| 2011/0145737 A1* | 6/2011 | Laugwitz et al. | 715/763 |
| 2011/0145738 A1* | 6/2011 | Laugwitz et al. | 715/763 |

* cited by examiner

ONE-DIMENSIONAL REPRESENTATION OF A TWO-DIMENSIONAL DATA STRUCTURE

BACKGROUND

1. Field of the Invention

The present invention relates generally to user interfaces and, more specifically, to a one-dimensional representation of a two-dimensional data structure.

2. Description of the Related Art

An example of a two-dimensional data structure is a hierarchical folder structure, where each folder includes one or more files and/or one or more nested folders. One problem often encountered when navigating such two-dimensional data structures involves the necessity to repeatedly enter into and exit out of each folder to view the contents of multiple folders included in the two-dimensional data structure.

For example, consider a two-dimensional data structure that includes three folders, where each folder includes ten files. To view all thirty total files included in the two-dimensional data structure, the user is first required to select the first folder to view the ten files included in the first folder. To access the files included in the second folder, the user is required to exit the first folder—typically by selecting a "back" button or a "folder-up" button that is included in typical file browsers. Once the user has exited the first folder, the user is then able to select the second folder to view the ten files that are included in the second folder. Again, the user is required to select the back button or folder-up button to return to the folder-level view in order to access the third folder. Finally, the user may select the third folder to view the ten files included in the third folder. As described, to view each and every file included in the one or more folders of the two-dimensional data structure, the user is required to continually navigate enter into and exit out of the folders, which is tedious and time consuming.

Accordingly, there remains a need in the art for a user interface that overcomes the limitations associated with typical two-dimensional data structures.

SUMMARY

One embodiment of the invention provides a method that includes causing at least a portion of a first representation of a first file and at least a portion of a second representation of a second file to be displayed in a user interface on a display associated with a computing device, where the first file is included in a first folder included in a folder structure stored in a memory included within the computing device, and the second file is included in a second folder included in the folder structure. The method further includes receiving user input to navigate content stored in the folder structure, and, in response to the user input, causing the at least a portion of the first representation and the at least a portion of the second representation to move in a first direction within the user interface.

One advantage of embodiments of the invention is that users can more easily navigate through the files included in the folder structure. When the last file of a current folder is reached, the first file in a next folder can be immediately accessible and visible to the user without additional navigation.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DESCRIPTION OF EXAMPLE EMBODIMENTS

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring embodiments of the invention.

Figure 1:
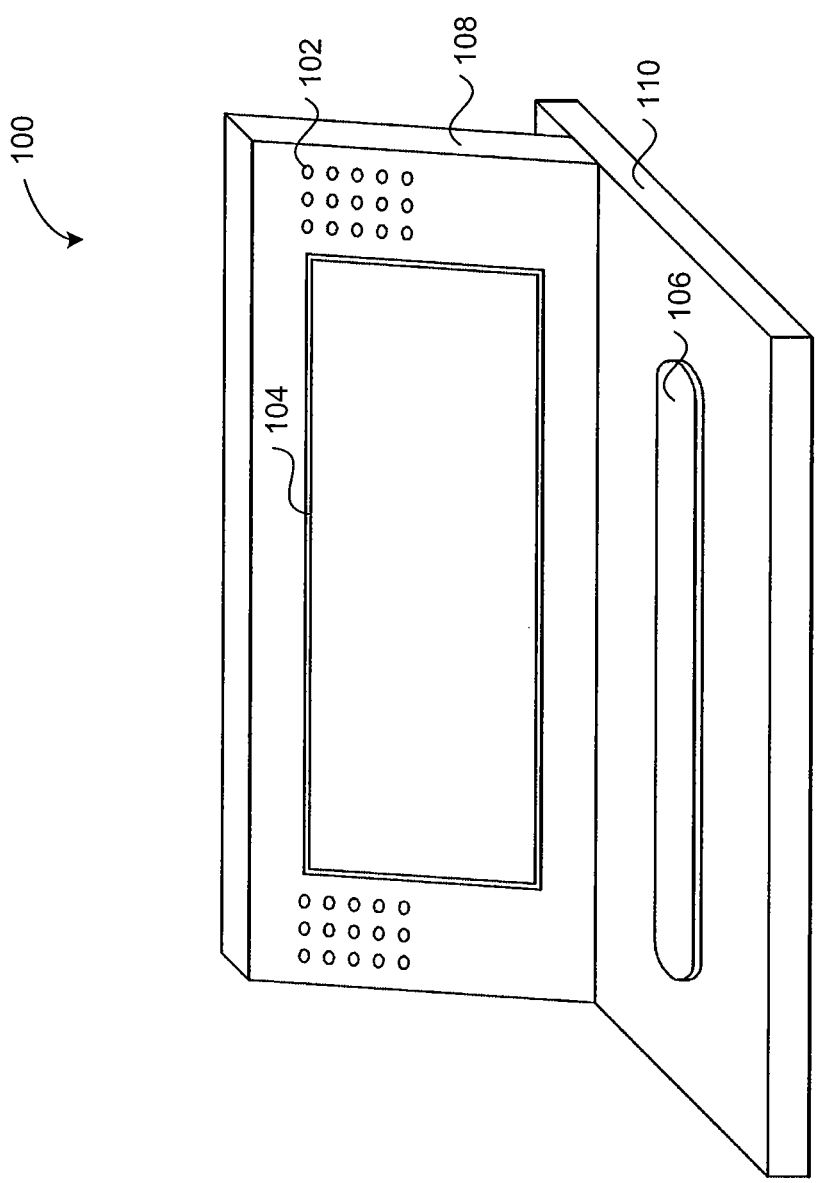
FIG. 1 is an isometric view of a computing device, according to one embodiment of the invention.

FIG. 1 is an isometric view of a computing device, according to one embodiment of the invention. In one embodiment, the computing device comprises a hand-held device (HHD) 100, as shown in FIG. 1. According to various embodiments, the HHD 100 may comprise a digital camera, a digital video camera, a digital video recorder, or other type of hand-held device. In alternative embodiments, the computing device may comprise any type of computing device, other than the HHD 100, such a personal computer, laptop, mobile phone, or the like.

As shown, the HHD 100 includes speakers 102, a touch screen 104, a touch strip 106, a cover 108, and a base 110. In one embodiment, the speakers 102 may be located to the left and the right of the touch screen 104.

In one embodiment, the touch screen 104 is implemented as a resistive touch screen. In alternative embodiments, the touch screen 104 may be implemented as a surface capacitive touch screen, a projected capacitive touch screen, or any technically feasible type of touch screen. For example, a user may activate user interface elements on the touch screen 104 using a finger or a stylus.

In some embodiments, the touch strip 106 is implemented as a capacitive-touch surface. In other embodiments, the touch strip 106 may be implemented as a resistive touch surface. In still further embodiments, the touch strip 106 is omitted from the HHD 100 and user can manipulate the user interface through the touch screen 104.

In some embodiments, the cover 108 can be positioned in one of two positions, including an upright position or a closed position. FIG. 1 illustrates the cover 108 in the upright position. In the closed position, the cover 108 lies in parallel to the base 110 and the touch strip 106 is hidden behind the cover 108. When the cover 108 is in the closed position, the user may slide the cover 108 along tracks that cause the cover 108 to be placed into the upright position. To return the cover 108 to the closed position, the user may slide the cover 108 back to the closed position along the tracks. In alternative embodiments, any technically feasible mechanism for causing the cover 108 to alternate between the upright position and the closed position may be implemented. In some embodiments, the cover 108 may not be moveable between two different positions and may be immobile.

In one embodiment, when the cover 108 is placed in the closed position, the HHD 100 enters into a record mode. When the HHD 100 is in the record mode, the user can operate the touch screen 104 and/or the touch strip 106 to capture videos and/or photos using the HHD 100. For example, in some implementations, the user cannot access the touch strip 106 when the cover 108 is placed in the closed position. In other implementations, such as when the touch strip 106 is located on the surface of the cover 108, the user can access both the touch screen 104 and the touch strip 106 when the cover 108 is placed in the closed position. In one embodiment, when the cover 108 is opened and placed in the upright position (as shown in FIG. 1), the HHD 100 enters a navigation mode, where the user can operate the touch screen 104 and/or the touch strip 106 to interact with and play back the videos and/or photos stored on the HHD 100.

Figure 2:
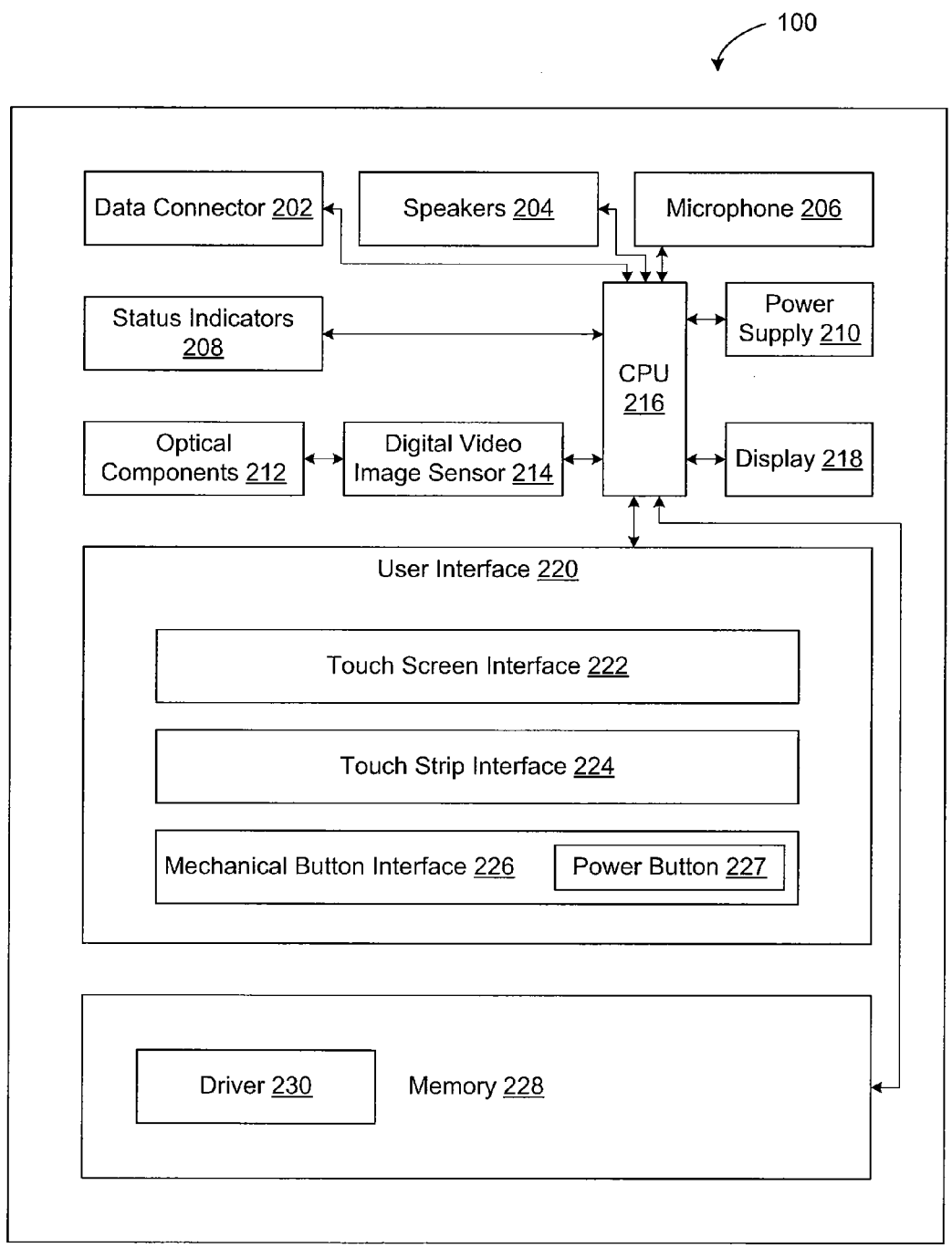
FIG. 2 is a block diagram of the hand-held device, according to one embodiment of the invention.
Figure 3:
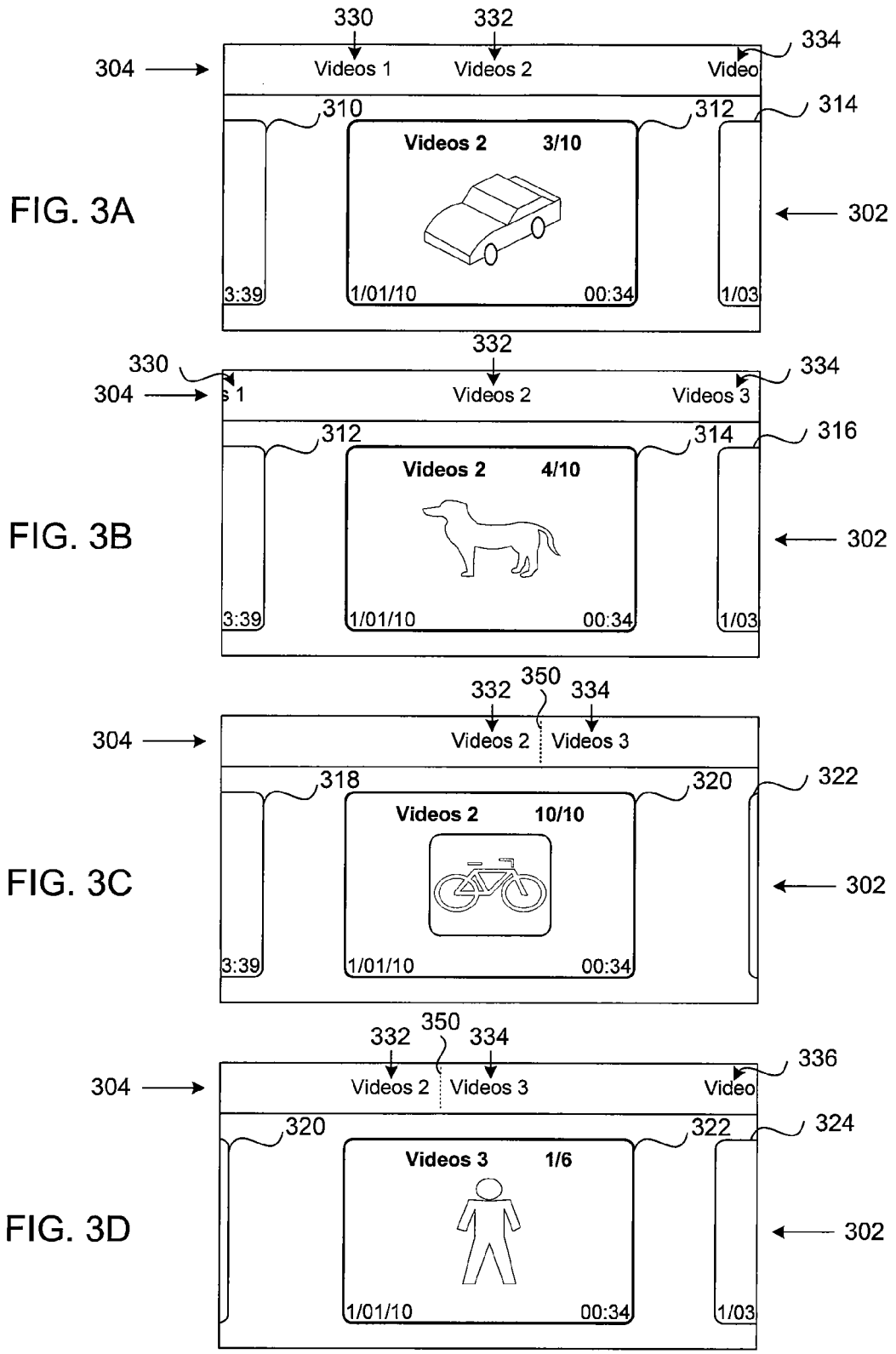
FIGS. 3A-3D are conceptual diagrams illustrating an interaction with a one-dimensional representation of a two-dimensional data structure, according to various embodiments of the invention.

FIG. 2 is a block diagram of the HHD 100, according to one embodiment of the invention. As shown, the HHD 100 includes, without limitation, a data connector 202, a speaker 204, a microphone 206, status indicators 208, a power supply 210, optical components 212, a digital video image sensor 214, a central processing unit (CPU) 216, a display 218, a user interface 220, and an internal memory 228. In one embodiment, the HHD 100 is a digital camera, such as a digital video camera.

The data connector 202 is an integrated mechanism that allows the HHD 100 to be connected with a separate TV or computer system, such as laptop or a desktop computer, and to transfer data to and from the computer system and/or output video and audio to the TV. The data connector 202 may be a universal serial bus (USB) connector, a firewire connector, a HDMI connector, a serial connector, or another type of connector that is capable of connecting the HHD 100 with the TV or the computer system. In some embodiments, the data connector may be wireless network adapter configured to allow the HHD 100 to connect to a wireless network.

The status indicators 208 visually indicate the current mode of operation of the HHD 100. The status indicators 208 include light emitting diodes (LEDs) that can be "ON," blinking, or "OFF," depending on the current operating mode of the HHD 100. The operating modes of the HHD 100 include, among others, a record mode and a playback mode. When in the record mode, the HHD 100 is configured to capture video and audio of a particular scene through the optical components 212 and the microphone 206, respectively. As described above, the HHD 100 may be in record mode when the cover 108 is in the closed position.

When in the playback mode, the HHD 100 is configured to play back digital videos, photos, or other files that are stored in the internal memory 228 included in the HHD 100. The digital videos or photos stored in the internal memory 228 may be videos or photos captured with the HHD 100 or videos or photos transferred to the HHD 100, but not captured by the HHD 100, including videos or photos downloaded from the Internet. In one embodiment, the digital videos or photos may be displayed on the display 218, and any audio may be output through the speakers 204. In alternative embodiments, the digital video or photo and audio may be output to a TV or to a computer system for playback. In some embodiments, the display 218 comprises the touch screen 104, described in FIG. 1. For example, when the HHD 100 is in playback mode, the touch screen 104 may orient itself horizontally and allow the content stored in the internal memory 228 to be played back in full-screen mode on the touch screen 104.

The power supply 210 provides power to the HHD 100. The power may be provided by a battery or an external power source (e.g., an AC outlet). In one embodiment, the battery is a rechargeable battery that is not removable from the HHD 100. In alternative embodiments, the battery may include one or more removable and/or replaceable batteries. The optical components 212, which may include one or more lenses, capture the scene and direct light associated with the scene onto the digital video image sensor 214. The digital video image sensor 214 converts the captured light information into digital video data and then transmits the digital video data to the CPU 216 for further processing.

The microphone 206, which may comprises one or more individual microphones, captures the sound in the scene. In one embodiment, the microphone includes hardware and/or software configured to convert the captured sound to digital audio data and to transmit the digital audio data to the CPU 216 for further processing. In alternative embodiments, the microphone may transmit raw analog data to the CPU 216 without any pre-processing.

The CPU 216 communicates with the various components within the HHD 100 to control the operations of the HHD 100. The CPU may be implemented as a single chip or as a combination of multiple chips. The CPU 216 also processes inputs from the user interface 220. For example, when the HHD 100 is in record mode, the CPU 116 transmits the digital video data received from the digital video image sensor 214 to the display 218 for display. In one embodiment, the CPU 216 combines the digital audio data received from the microphone 206 and the digital video data received from the digital video image sensor 214 to create a composite video file. The composite video file may then be transmitted to the internal memory 228 for storage. When the HHD 100 is in playback mode, the CPU 216 retrieves the composite video file from the internal memory 228 and transmits the video portion of the composite video file to the display 218 and the audio portion of the composite video file to the speakers 204. In alternative embodiments, the digital audio data received from the microphone 206 and the digital video data received from the digital video image sensor 214 may be stored separately in the internal memory 228.

When the HHD 100 is in playback mode, the display 218 may be configured to display composite video files stored on the HHD 100. When the HHD 100 is in record mode, the display 218 may be configured to display an image of the scene being captured while the corresponding composite video file is being recorded.

The user interface 220 includes a touch screen interface 222, a touch strip interface 224, and/or a mechanical button interface 226. In some embodiments, the touch screen interface 222 is used to display information to the user and to process input received from the user through the touch screen 104. For example, when the HHD 100 is in playback mode, the touch screen interface 222 may provide user interface elements that allow the user to play, pause, stop, fast forward, rewind, and/or otherwise control the playback of video files on the touch screen 104. In some embodiments, the user interface elements that comprise the touch screen interface 222 may be an overlay over the video and/or photo being displayed on the touch screen 104. In some embodiments, the user may cause the user interface elements that comprise the touch screen interface 222 to be displayed and enabled by pressing and holding anywhere on the touch screen 104 during playback. Similarly, in some embodiments, the user may cause the user interface elements that comprise the touch screen interface 222 to be not displayed and disabled by pressing anywhere on the touch screen 104 during playback.

The functions provided by the touch screen interface 222 and touch screen 104 in the various operating modes of the HHD 100 are described in greater detail below in conjunction with FIGS. 3A-3D and 4-6.

In one embodiment, the touch strip interface 224 is used to process input received from the user through the touch strip 106. For example, when the HHD 100 is in playback mode, the touch strip 106 can be used to scroll left and right through video thumbnails that are displayed on the touch screen 104. The scroll left and/or scroll right inputs generated by the user are received by the touch strip 106 and processed by the touch strip interface 224.

The mechanical button interface 226 may include a power button 227. The power button 227 is configured to turn the HHD 100 ON and OFF. In some embodiments, the power button 227 is implemented as a capacitive-touch button. In alternative embodiments, the power button 227 may be implemented as an induction button, an analog-resistive button, or any other technically feasible button type that can be engaged by the user. In some embodiments, the power button may be included in the touch screen interface 222 and/or the touch strip interface 224, and the mechanical button interface 226 is omitted.

The internal memory 228 stores the composite video files as well as firmware that is executed by the CPU 216 to control the operations of the HHD 100. The internal memory 228 comprises either volatile memory, such as dynamic random access memory (DRAM), or non-volatile memory, such as a hard disk or a flash memory module, or a combination of both volatile and non-volatile memory. The internal memory 228 also stores a software driver 230 implemented as a set of program instructions configured to coordinate operation between the user interface 220 and the other components of the HHD 100, as described in greater detail herein. For example, the program instructions that constitute the driver 240 may be executed by the CPU 216 to cause different composite video file thumbnails to be displayed.

The HHD 100 provides only one example of a hand-held device, in accordance with embodiments of the invention. Any other computing devices having any number of different elements are also within the scope of embodiments of the invention.

FIGS. 3A-3D are conceptual diagrams illustrating an interaction with a one-dimensional representation of a two-dimensional data structure, according to various embodiments of the invention. FIG. 3A is a conceptual diagram that illustrates a user interface 302 that is displayed on the touch screen 104 when a user has activated a playback mode of the HHD 100, according to one embodiment of the invention. In some embodiments, the playback mode is automatically activated when the cover 108 is placed in the upright position, as described above. As also shown in FIG. 3A, the user interface 302 includes a folder bar 304 that includes a previous folder 330, a current folder 332, and a next folder 334. In one embodiment, a central portion of the user interface 302 displays thumbnails of a previous video 310, a current video 312, and a next video 314.

In some embodiments, each of the previous video 310, current video 312, and the next video 314 may display information associated with the folder that includes the video. In alternative embodiments, the previous video 310, the current video 312, and the next video 314 may also display additional information, such as video resolution, audio quality, date, timelength and the time of day that the video was recorded. The information can be displayed anywhere within the user interface 302, such as underneath each video thumbnail, or within each video thumbnail, as illustrated in FIGS. 3A-3D. To play back the current video 312, the user may touch the thumbnail of the current video 312 or tap the center of the touch strip 106.

FIG. 3B is a conceptual diagram illustrating the user interface 302 that is displayed when a user navigates from the current video 312 to the next video 314, according to one embodiment of the invention. In some embodiments, the user may navigate through the videos by touching the thumbnail of the next video 314 displayed on the touch screen 104, by tapping the left or right side of the touch strip 106, and/or by sliding his or her finger in a right-to-left or left-to-right manner across the touch strip 106. In some embodiments, the input of the touch strip 106 may be inverted so that the user may advance from the current video 312 to the next video 314 by sliding his or her finger in a left-to-right fashion across the touch strip 106. When the next video 314 is selected by the user, the previous video 310 is replaced by the current video 312, the current video 312 is replaced by the next video 314, and the next video is replaced by, if present, a new next video 316. As described in greater detail herein, the new next video 316 is included within the same folder that includes the current video 312, or the new next video 316 is included within a folder that follows the folder that includes the current video 312.

As shown in FIG. 3B, the position of the previous folder 330 and the next folder 334 moves to the left within the folder bar 304 relative to the position of the previous folder 330 and the next folder 334 in FIG. 3A, while the position of the current folder 332 remains unchanged. The relocation of position of the previous folder 320 and the next folder 334 within the folder bar 304 effectively communicates to the user the advancement through the files included within the current folder 332. As the user advances to each next video, the previous folder 330 and the next folder 334 advance even further to the left within the folder bar 304, as shown in FIG. 3C. In one embodiment, the movement of the previous folder 330 and the next folder 334 within the folder bar 304 is linear and the position of the folders is relocated by equal amount in stepwise segments as each next video is selected. In alternative embodiments, the movement of the position of the previous folder 330 and the next folder 334 within the folder bar 304 is non-linear.

FIG. 3C is a conceptual diagram illustrating the user interface 302 that is displayed when the current video 320 is the last video included within the current folder 332, according to one embodiment of the invention. As shown, the previous folder 330 is no longer visible within the folder bar 304, and the position of the next folder 334 is relocated to be in close proximity to the current folder 332. In some embodiments, a graphical underlay designates the current folder 332 position versus the next folder 334 position when the current video is the last file within the current folder 332. In other embodiments, a vertical line 350 is displayed between the current folder 332 and the next folder 334 when the current video is the last file within the current folder 332.

In some embodiments, when the current video 320 is the last video in the current folder 332, a vertical line is displayed between the current video 320 and the next video 322 when the current video is the last file within the current folder 332.

In other embodiments, the distance between the current video 320 and the next video 322 is greater than the space between the current video 320 and the previous video 318. The distance between the current video 320 and the next video 322 is greater than the space between the current video 320 and the previous video 318 when the previous video 318 is included within the same folder as the current video 320. This increased spacing, as illustrated in FIG. 3C, communicates to the user that the current video 320 is the last video included in the current folder 322. Thus, if the user selects the next video 322 by any of the techniques discussed above, then the user is selecting a video that is included within the next folder 334.

FIG. 3D is a conceptual diagram illustrating the user interface 302 that is displayed when the user has navigated from the last file in the current folder 332 to the first file in the next folder 334, according to one embodiment of the invention. As shown, the previous folder 330 is replaced by the current folder 332, the current folder 332 is replaced by the next folder 334, and the next folder 334 is replaced by a new next folder 336. As is also shown, the previous video 318 is replaced by the current video 320, the current video 320 is replaced by the next video 322, and the next video 322 is replaced by a new next video 324. In some embodiments, the HHD 100 may emit a sound that communicates to the user that a new folder has been accessed. The current folder 332, the next folder 334, and new next folder 336 may also "snap" into their updated positions within the folder bar 304.

As also shown in FIG. 3D, the current video 320 is included within the current folder 332. Therefore, in some embodiments, a vertical line is displayed between the current video 320 and the next video 322 included in the next folder 334. In other embodiments, the current video 320 is spaced at an increased distance from the next video 322 included in the next folder 334. Since the new next video 324 is also included in the next folder 334, the next video 322 is spaced at a shorted distance from the new next video 324, relative to the spacing between the current video 320 and the next video 322.

Figure 4:
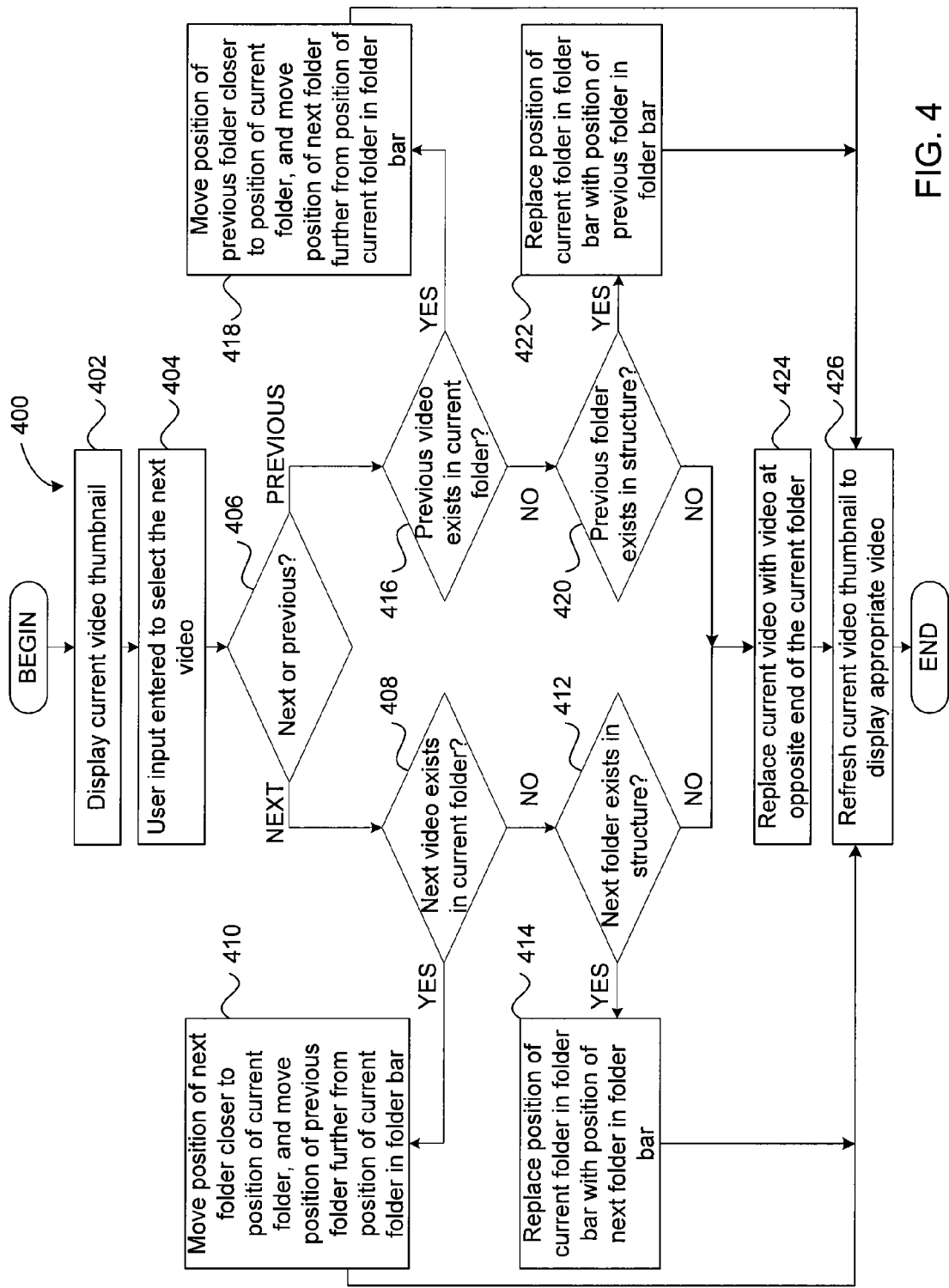
FIG. 4 is a flow diagram of method steps for interacting with a two-dimensional data structure using a one-dimensional input surface, according to one embodiment of the invention.

FIG. 4 is a flow diagram of method steps for interacting with a two-dimensional data structure using a one-dimensional input surface, according to one embodiment of the invention. Persons skilled in the art will understand that, even though the method 400 is described in conjunction with the systems of FIGS. 1-3D, any system configured to perform the method steps, in any order, is within the scope of embodiments of the invention.

As shown, the method 400 begins at step 402, where a processor included in a computing device, such as the HHD 100, causes a display screen to display a current video thumbnail within a user interface. At step 404, the processor determines that a user has entered user input to select the next or the previous video. In some embodiments, the user input may be detected as a press or touch of the thumbnail of the next or previous video displayed on the touch screen. Alternatively, the user input may be detected as the user sliding his or her finger over a touch strip, described in FIG. 1. For example, to select the next video, the user may place his or her index finger on touch strip. Then, while maintaining contact with the touch strip, the user slides his or her index finger across the touch strip in a leftward motion. The index finger is then lifted upwards away from the touch strip. To select the previous video, the user may perform the opposite action by sliding his or her finger in a rightwards manner along the touch strip.

At step 406, the processor determines whether the user input selects a next video or a previous video. If, at step 406, the processor determines that the user input selects a next video, then the method 400 proceeds to step 408.

At step 408, the processor determines whether a next video is included in the current folder. In one embodiment, the processor references a memory included in the computing device that stores information associated with the folder structure to determine whether a next video is included in the current folder. If, at step 408, the processor determines that a next video exists in the current folder, then the method 400 proceeds to the step 410.

At step 410, the processor moves a position of the next folder closer to a position of the current folder in a folder bar, and moves a position of the previous folder further from a position of the current folder in the folder bar. In one embodiment, the folder bar is displayed above the current video thumbnail in a horizontal orientation. The folder bar may include a visual indication, such as a graphic underlay or an icon, for the position of the previous folder, the current folder, and the next folder, as described above in FIGS. 3A-3D. In some embodiments, for each next video in the current folder that is accessed by the user, the display may display an animation of the previous folder icon moving toward the left boundary of the folder bar while the next folder icon moves closer to the current folder icon. The location of the current folder icon remains stationary.

At step 426, the processor refreshes the current video thumbnail to display the appropriate current video. In one embodiment, the processor causes a pair of speakers included in the computing device to emit a sound that communicates to the user that the current video has been updated in the user interface. In another embodiment, the screen flashes and the user interface displays the current video thumbnail with a highlighted border.

Referring back to step 408, if the processor determines that a next video does not exist in the current folder, then the method 400 proceeds to step 412. At step 412, the processor determines whether a next folder exists in the folder structure. In one embodiment, the processor performs a lookup of the folder structure stored in the memory to determine whether any other folders exist in the folder structure. If, at step 412, the processor determines that a next folder exists within the folder structure, then the method 400 proceeds to step 414.

At step 414, the processor replaces a position of the current folder with a position of the next folder in the folder bar. In one embodiment, the current folder icon snaps into the location of the previous folder icon, the next folder icon snaps into the original location of the current folder icon (e.g., the center of the folder bar). A new next folder icon also snaps into the original location of the next folder icon. In some embodiments, the folder bar flashes and the positions of each of the previous folder, the current folder, and the next folder icons are updated without an animation.

Referring back to step 412, if the processor determines that a next folder does not exist in the folder structure, then the method 400 proceeds to step 424. At step 424, the processor replaces the current video in the user interface with the video at the opposite end of the current folder. For example, if the current video at step 412 is the last video in the current folder, then the current video is replaces with the first video in the current folder. The method 400 then proceeds to step 426, described above.

Referring back to step 406, if the processor determines that the user input selects a previous video, then the method 400 proceeds to step 416. At step 416, the processor determines whether a previous video exists in the current folder. In some embodiments, the processor makes the determination using the technique described above in step 408. If, at step 416, the processor determines that a previous video exists in the current folder, then the method 400 proceeds to the step 418.

At step 418, the processor moves a position of the previous folder closer to a position of the current folder, and movies a position of the next folder further from the position of the current folder in the folder bar. In some embodiments, step 418 is performed using a similar technique to step 410, described above. The method 400 then proceeds to step 426, also described above.

Referring back to step 416, if the processor determines that a previous video does not exist in the current folder, then the method 400 proceeds to step 420. At step 420, the processor determines whether a previous folder exists in the folder structure using techniques similar to those described above in step 412. If, at step 420, the processor determines that a previous folder exists within the folder structure, then the method 400 proceeds to step 422.

At step 422, the processor replaces a position of the current folder with a position of the previous folder in the folder bar. The replacement of the current folder with the previous folder may be accomplished using a technique similar to that described above in step 414. The method 400 proceeds to step 426, also described above.

Referring back to step 420, if the processor determines that a previous folder does not exist in the folder structure (i.e., the current folder is the only folder in the folder structure), then the method 400 proceeds to step 424, described above.

Figure 5:
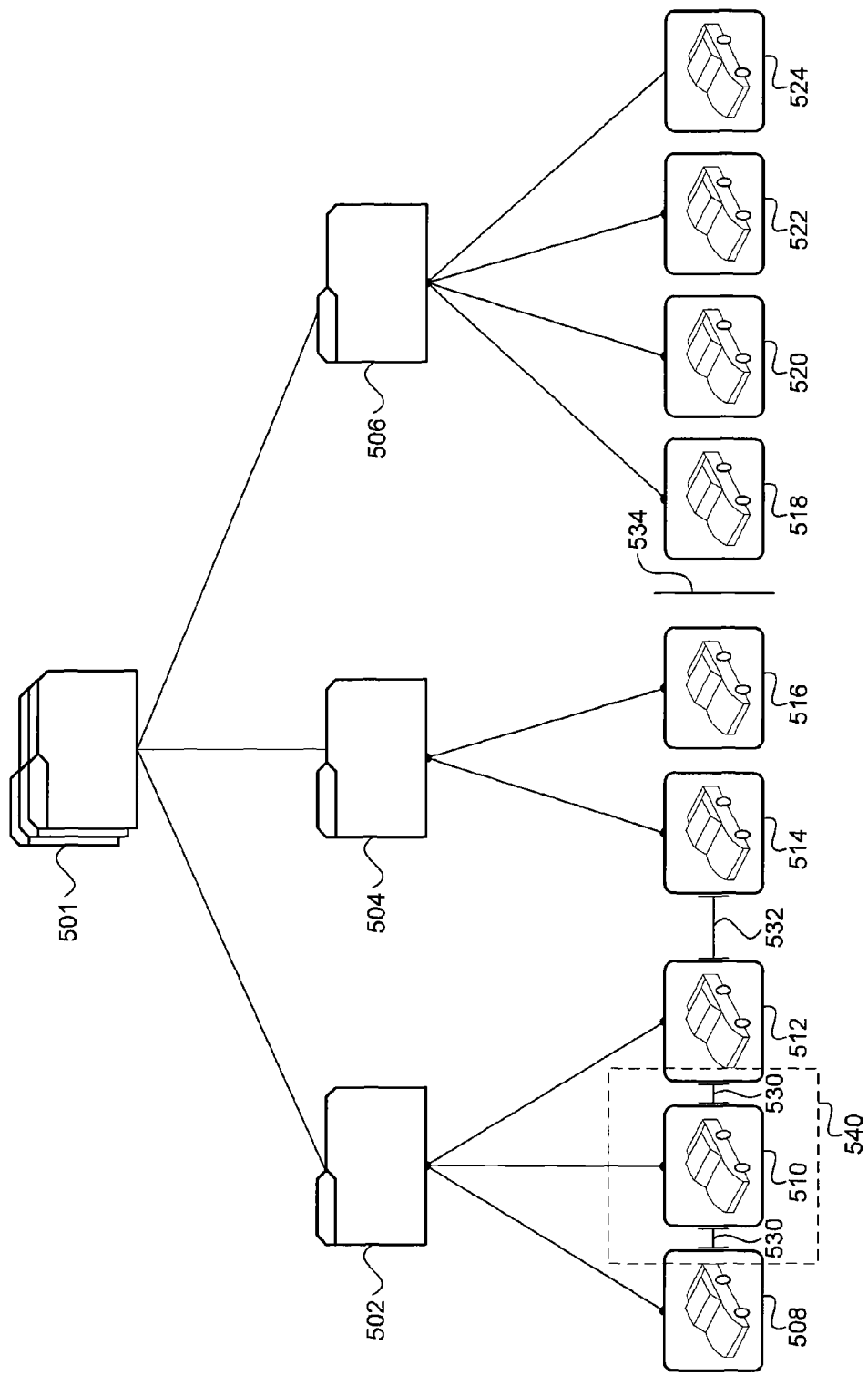
FIG. 5 is a conceptual diagram illustrating a one-dimensional representation of a two-dimensional folder structure, according to one embodiment of the invention.

FIG. 5 is a conceptual diagram illustrating a one-dimensional representation of a two-dimensional folder structure, according to one embodiment of the invention. As shown, a folder structure 501 includes folders 502-506 and video thumbnails 508-524. A one dimensional representation of the folder structure 501 includes a same folder spacing 530, a vertical line at position 532, or different folder spacing 532, and a window 540.

The folder structure 501 includes folder 502, folder 504, and folder 506. The folder 502 includes video thumbnails 508, 510, and 512. The folder 504 includes video thumbnails 514 and 516. The folder 506 includes video thumbnails 518, 520, 522, and 524.

As shown and described in FIGS. 3A-5, video thumbnails that are included within the same folder are spaced using the same folder spacing 530. For example, each of the video thumbnails 508, 510, and 512 are included within the folder 502, and are, therefore, spaced using the same folder spacing 530. Video thumbnails 514 and 516 are included within the folder 504 and are also spaced using the same folder spacing 530. Video thumbnails 518, 520, 522, and 524 are, similarly, included within the folder 506 and are, therefore, also spaced using the same folder spacing 530.

In one embodiment, the vertical line 534 is used to space video thumbnails when a folder break occurs. For example, a folder break occurs between video thumbnails 516 and 518. Thus, the vertical line 534 is displayed to demarcate the folder break.

In another embodiment, the different folder spacing 532 is used to space video thumbnails when a folder break occurs. For example, a folder break occurs between video thumbnails 512 and 514. Thus, spacing between a last video thumbnail of one folder and a first video thumbnail of a next folder may be spaced using the different folder spacing 532. As shown, the different folder spacing 532 is larger than the same folder spacing 530.

Implementing either the vertical line 534 or the different folder spacing 532 allows a user to effectively identify to which folder a particular video thumbnail belongs. In alternative embodiments, rather than using the vertical line 534 or the different folder spacing 532 as an indication of a folder break, other visual indications may be used. For example, an icon may be displayed when a folder break occurs.

FIG. 5 also shows the window 540, which represents what is displayed in the user interface when the video thumbnail 510 is the current video thumbnail in the user interface. As shown, the full video thumbnail 510 is displayed, whereas only a portion of video thumbnails 508, 512 is displayed.

Figure 6:
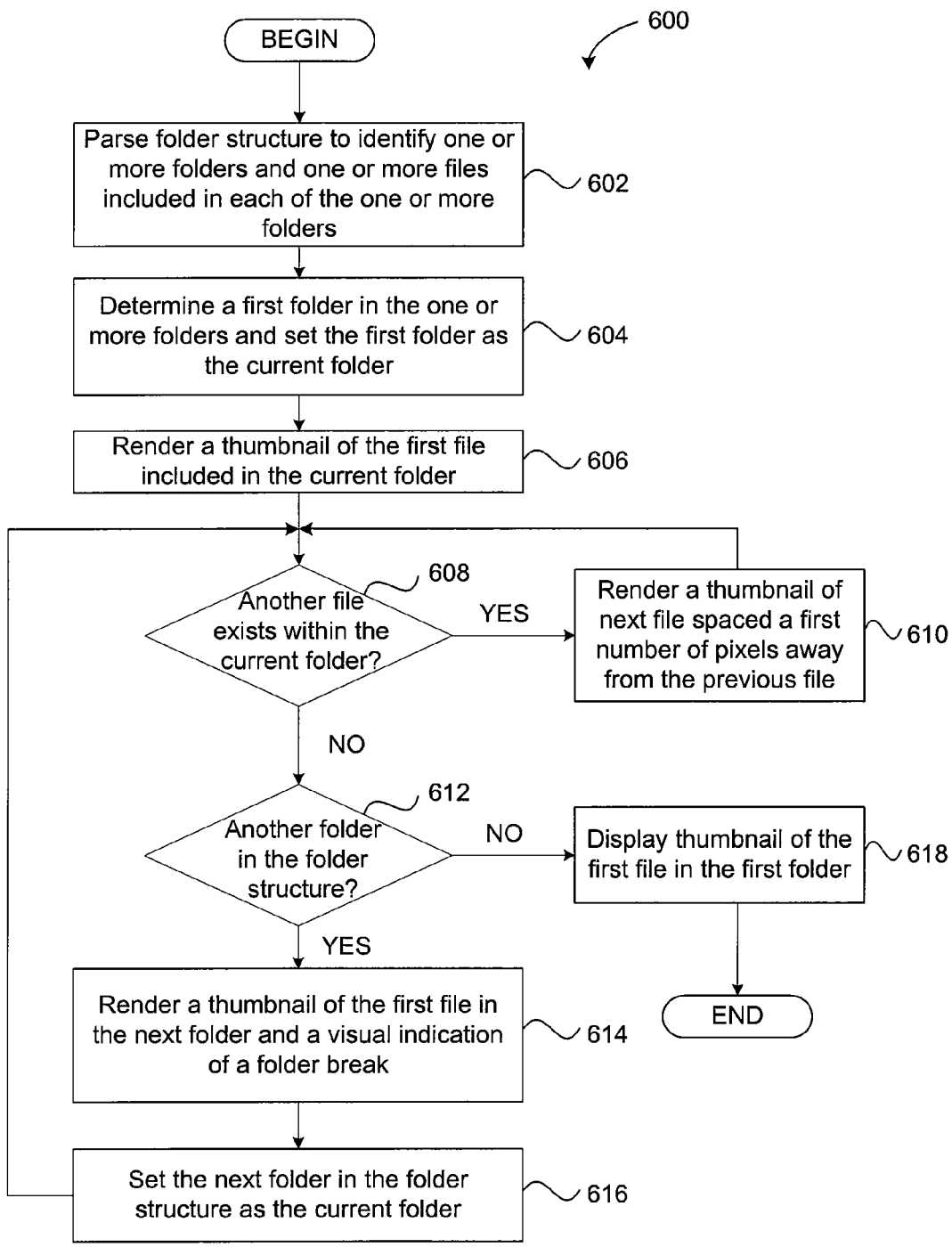
FIG. 6 is a flow diagram of method steps for rendering appropriate spacing between video thumbnails based on a folder structure, according to one embodiment of the invention.

FIG. 6 is a flow diagram of method steps for rendering appropriate spacing between video thumbnails based on a folder structure, according to one embodiment of the invention. Persons skilled in the art will understand that, even though the method 600 is described in conjunction with the systems of FIGS. 1-3D and 5, any system configured to perform the method steps, in any order, is within the scope of embodiments of the invention.

As shown, the method 600 begins at step 602, where a processor included in a computing device, such as the HHD 100, parses a folder structure to identify one or more folders and one or more files included in each of the one or more folders. In one embodiment, the processor accesses a memory included in the computing device to identify a folder structure that includes the one or more folders, where each folder may include one or more video files.

At step 604, the processor determines a first folder in the one or more folders and sets the first folder as the current folder. In some embodiments, the processor may parse the folder structure and numerically order each of the folders that are included within the folder structure. The processor then sets the first folder as the current folder.

At step 606, the processor renders a thumbnail of the first file included in the current folder. In one embodiment, the processor performs a memory lookup of the current folder to determine the total number of videos that are included within the current folder. The processor then selects the first video that is included within the current folder. In one embodiment, the computing device includes a touch screen that displays the user interface 302 described above in FIGS. 3A-3D, where the user interface includes a folder bar that displays folder information and a center portion that displays video thumbnails. For example, the processor may render a thumbnail associated with the first file included in the current folder and display the thumbnail in the center portion of the user interface.

At step 608, the processor determines whether another file exists within the current folder. As described above in step 606, the processor may reference the total number of files that are included within the current folder. If, at step 608, the processor determines that another file exists within the current folder, then the method 600 proceeds to step 610.

At step 610, the processor renders a thumbnail of the next file, spaced a first number of pixels away from the previous file. In one embodiment, the next file is rendered fifty pixels to the right of the thumbnail of the previously-rendered file. A spacing of fifty pixels may be used each time that a file is rendered that is included in the same folder as the previously-rendered file. In other embodiments, the spacing that is used to separate files that are included within the same folder is customized by the user of the computing device to be any desirable spacing, such as one inch on the screen, seventy-five pixels, or the like. The method 600 then returns to step 608, described above.

Referring back to step 608, if the processor determines that another file does not exist within the current folder, then the method 600 proceeds to step 612. At step 612, the processor determines whether another folder exists in the folder structure. In one embodiment, the processor parses the folder structure identified in steps 602 and 604 to make this determination. If, at step 612, the processor determines that another folder exists within the folder structure, then the method 600 proceeds to step 614.

At step 614, a thumbnail of the last file of the current folder has already been rendered, and a next folder is included within the folder structure. The processor then renders a thumbnail of the first file in the next folder and a visual indication of a folder break. In some embodiments, the visual indication may be at least one of a vertical line before the thumbnail and a larger amount of spacing between the thumbnail of the first file in the next folder and the thumbnail of the last file in the current folder. For example, the processor may render the thumbnail of the first file in the next folder one hundred pixels away from the thumbnail of the last file in the current folder. Thus, the folder break between the last file of the current folder and the first file of the next folder is depicted in the user interface by the visual indication. In another example, rather than using different spacing between thumbnails, the visual indication may be a vertical bar that is displayed when a folder break occurs, where no vertical bar is displayed between video thumbnails in the same folder.

At step 616, the processor sets the next folder in the folder structure as the current folder. The method 600 the returns to step 608. The method 600 loops through steps 608-616 until all of the files that are included within all of the folders in the folder structure have been rendered and appropriately spaced within the user interface.

Referring back to step 612, if the processor determines that another folder does not exist within the folder structure, then the method 600 proceeds to step 618. At step 618, the processor causes the thumbnail of the first file included in the first folder to be displayed in the user interface. As described above in step 616, the step 618 is reached when the folder structure has been parsed and is completely rendered. In one embodiment, when the processor completes the rendering of the folder structure, the processor causes a pair of speakers included in the computing device to emit and sound that communicates to the user that a navigation mode of the computing device is ready for input, described above in FIGS. 3A-3D.

As described herein, the method 600 provides a technique for rendering the two-dimensional folder structure in a one-dimensional format. The technique described in the method 600 parses the entire folder structure and renders a complete one-dimensional representation of the folder structure before the user interface is displayed that includes the first thumbnail. In alternative embodiments, each thumbnail is rendered "on the fly" when the next or previous video is selected. Thus, in these embodiments, the entirety of the folder structure is not pre-rendered, as described in the method 600.

In sum, embodiments of the invention provide a technique for generating a one-dimensional representation of a two-dimensional data structure. The one-dimensional representation can be navigated by the user in a linear manner, without the need to navigate up-and-down within the two-dimensional data structure. Additionally, embodiments of the invention provide visual indication to the user of the folder structure in the one-dimensional representation. A folder bar may be displayed to effectively communicate the current folder position as the user navigates through the one-dimensional representation. As the user approaches the last file of the current folder, a position of the next folder moves closer to the position of the current folder, and a position of the previous folder moves further away from the position of the current folder. Additionally, a visual indication, such as a vertical bar or more spacing, may be displayed between videos in different folders than between videos in the same folder to allow the user to identify folder breaks.

One advantage of embodiments of the invention is that users can more easily navigate through the files included in a set of folders. When the last file of a current folder is reached, the first file in a next folder can be immediately accessible and visible to the user without additional navigation.

While the forgoing is directed to embodiments of the invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the invention, are embodiments of the invention. Therefore, the scope of the invention is determined by the claims that follow.

What is claimed is:

1. A method comprising:
outputting for display, in a user interface on a display, at least a portion of a first representation of a first file and at least a portion of a second representation of a second file, wherein the first file is included in a current folder included in a folder structure stored in a memory included within the computing device, and the second file is included in a next folder according to a predetermined ordering scheme and included in the folder structure;
outputting for display, in the user interface on the display, a representation of the current folder and the next folder, the representation of the current folder and the next folder comprising a folder bar that identifies the current folder and the next folder included in the folder structure;
receiving user input to navigate content stored in the folder structure; and
in response to the user input:
causing the at least a portion of the first representation and the at least a portion of the second representation to move in a first direction within the user interface; and
causing the representation of the next folder to move in the first direction within the user interface.

2. The method of claim 1, wherein movement in the first direction is linear.

3. The method of claim 1, wherein the movement in the first direction is at least one of left-to-right movement and right-to-left movement.

4. The method of claim 1, wherein the first file comprises a video file, and the representation of the first file comprises a thumbnail associated with the video file.

5. The method of claim 1, wherein spacing between the at least a portion of the first representation and the at least a portion of the second representation within the user interface is greater than spacing between the at least a portion of the first representation and at least a portion of a third representation of a third file within the user interface, wherein the third file is also included in the first folder.

6. The method of claim 1, wherein a vertical line is displayed between the at least a portion of the first representation and the at least a portion of the second representation within the user interface.

7. The method of claim 1, wherein a first indication within the folder bar identifies the current folder and is associated with the first folder, and a second indication within the folder bar identifies the next folder and is associated with the second folder, and wherein causing the representation of the next folder to move in the first direction comprises causing the second indication to be displayed closer to the first indication within the folder bar.

8. The method of claim 1, wherein the computing device includes a touch strip configured to receive the user input.

9. The method of claim 1, wherein the display associated with the computing device comprises a touch screen configured to receive the user input.

10. A non-transitory computer-readable storage medium storing instructions that, when executed by a processor, cause a computing device to interact with a folder structure, by performing the steps of:

outputting for display, in a user interface on a display, at least a portion of a first representation of a first file and at least a portion of a second representation of a second file, wherein the first file is included in a current folder included in a folder structure stored in a memory included within the computing device, and the second file is included in a next folder according to a predetermined ordering scheme and included in the folder structure;

outputting for display, in the user interface on the display, a representation of the current folder and the next folder, the representation of the current folder and the next folder comprising a folder bar that identifies the current folder and the next folder included in the folder structure;

receiving user input to navigate content stored in the folder structure; and in response to the user input:
causing the at least a portion of the first representation and the at least a portion of the second representation to move in a first direction within the user interface; and
causing the representation of the next folder to move in the first direction within the user interface.

11. The computer-readable storage medium of claim 10, wherein movement in the first direction is linear.

12. The computer-readable storage medium of claim 10, wherein the movement in the first direction is at least one of left-to-right movement and right-to-left movement.

13. The computer-readable storage medium of claim 10, wherein the first file comprises a video file, and the representation of the first file comprises a thumbnail associated with the video file.

14. The computer-readable storage medium of claim 10, wherein spacing between the at least a portion of the first representation and the at least a portion of the second representation within the user interface is greater than spacing between the at least a portion of the first representation and at least a portion of a third representation of a third file within the user interface, wherein the third file is also included in the first folder.

15. The computer-readable storage medium of claim 10, wherein a vertical line is displayed between the at least a portion of the first representation and the at least a portion of the second representation within the user interface.

16. The computer-readable storage medium of claim 10, wherein a first indication within the folder bar identifies the current folder and is associated with the first folder, and a second indication within the folder bar identifies the next folder and is associated with the second folder, and wherein causing the representation of the next folder to move in the first direction comprises causing the second indication to be displayed closer to the first indication within the folder bar.

17. A computer system, comprising:
a processor; and
a memory storing instructions that when executed by the processor cause the computer system to interact with a folder structure, by performing the steps of:

outputting for display, in a user interface on a display, at least a portion of a first representation of a first file and at least a portion of a second representation of a second, wherein the first file is included in a current folder included in a folder structure stored in a memory included within the computing device, and the second file is included in a next folder according to a predetermined ordering scheme and included in the folder structure;

outputting for display, in the user interface on the display, a representation of the current folder and the next folder, the representation of the current folder and the next folder comprising a folder bar that identifies the current folder and the next folder included in the folder structure;

receiving user input to navigate content stored in the folder structure; and in response to the user input:
causing the at least a portion of the first representation and the at least a portion of the second representation to move in a first direction within the user interface; and
causing the representation of the next folder to move in the first direction within the user interface.

18. The system of claim 17, wherein a first indication within the folder bar identifies the current folder and is associated with the first folder, and a second indication within the folder bar identifies the next folder and is associated with the second folder, and wherein causing the representation of the next folder to move in the first direction comprises causing the second indication to be displayed closer to the first indication within the folder bar.

19. The system of claim 17, wherein spacing between the at least a portion of the first representation and the at least a portion of the second representation within the user interface is greater than spacing between the at least a portion of the first representation and at least a portion of a third representation of a third file within the user interface, wherein the third file is also included in the first folder.

20. The system of claim 17, wherein a vertical line is displayed between the at least a portion of the first representation and the at least a portion of the second representation within the user interface.

21. The system of claim 17, wherein the first file comprises a video file, and the representation of the first file comprises a thumbnail associated with the video file.

22. The system of claim 17, wherein movement in the first direction is linear, and wherein the movement in the first direction is at least one of left-to-right movement and right-to-left movement.

* * * * *